Patented Aug. 27, 1940

2,212,965

UNITED STATES PATENT OFFICE 2,212,965

PROCESS FOR EFFECTING CARBAZOLE RING FORMATION OF COMPOUNDS OF THE ANTHRAQUINONE SERIES

Franz Wieners, Cologne-Stammheim, and Walter Mieg, Opladen, Germany, assignors to General Aniline & Film Corporation, a corporation of Delaware No Drawing. Application September 10, 1938, Serial No. 229,328. In Germany September 15, 1937

4 Claims. (Cl. 260—316)

The present invention relates to an improved process for effecting carbazole ring formation of compounds of the anthraquinone series.

It is known that anthrimides are capable of undergoing carbazole ring formation by fusing them with aluminium chlorides. In U. S. Patent No. 1,690,307, a modification of this process is described which consists in causing the action of the aluminium-halide upon the anthrimide to proceed in the presence of cyclic compounds containing a tertiary nitrogen atom such as pyridine, quinoline or dimethylaniline. Further modifications of this process are described in U. S. Patents No. 2,073,022 and No. 2,187,815 which consist in performing the reaction in the presence of such inorganic or organic acid halides or organic nitriles as are capable of forming molecular compounds with the aluminium halide.

We have found that carbazole ring formation can advantageously be effected by the action of addition compounds of aluminium halides, preferably aluminium chloride with sulfur dioxide. The preparation of such addition compounds is described in Gmelin's Compendium of Inorganic Chemistry, 8th ed., "Aluminium," part B, page 210.

The anthrimides which serve as starting materials for our new process may be defined as secondary aromatic amines wherein at least one of the aromatic radicals is an acylamino anthraquinone radical or an anthraquinone radical having condensed therewith a ring system, as for instance an acridone or thioxanthone ring. The other radical may be an anthraquinone radical or any other aromatic group, for instance a benzene, naphthalene, benzanthrone, perylene, pyrene or pyranthrone radical and the like. The nuclei may contain various substituents, however, at least one orthoposition with respect to the secondary amino group or groups, must be unsubstituted. As starting materials there may be employed also compounds having several secondary amino groups, that is to say for instance compounds of the type of tri- or other polyanthrimides.

In our process we may prepare at first the addition compound by passing sulphur dioxide over aluminium chloride, preferably with an addition of a neutral salt, for instance sodium or potassium chloride, and subsequently adding the anthrimide which is to be carbazolized or the addition compound may be prepared in the presence of the anthrimide itself. The sulfur dioxide may also be employed in the liquid state. Furthermore, it can be replaced by a dry alkali bisulfite. In this case the formation of an analogous addition compound is supposed.

Our process just described possesses important advantages over the processes above mentioned. Besides that our process is much cheaper as it works only with the cheap sulfur dioxide, it has the advantage that the melts can be worked up in a very simple manner due to their easy liability of decomposition and due to the fact that the decomposition products of the new condensing agents are very easily soluble in water. Furthermore the described addition compounds show an increased dissolving power with respect to the starting materials as compared with known agents. In many cases the reaction can be performed at much lower temperatures, thus avoiding the danger of undesirable by-reactions and yielding dyestuffs of a high degree of purity. Therefore a particular purification is in most cases superfluous.

Another feature of the present invention resides in the product of the following formula

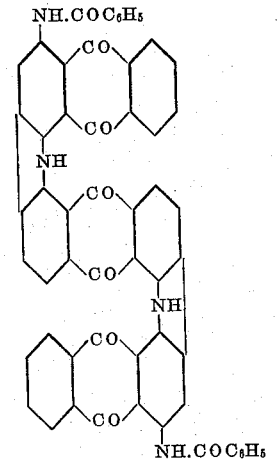

According to the French Patent No. 711,433, Example 8 4'.4''-dibenzoylamino-1'.1''-1.5-trianthrimide has been subjected to a condensation by heating it with aluminium chloride in the presence of nitrobenzene. This product, however, is impure due to the fact that deacetylation and probably partially formation of acridines occur.

Contrary thereto according to the present invention the above mentioned dyestuff is obtained in a substantially pure state which can be seen from the fact that our new dyestuff dyed on cotton yields very clear shades which could not be obtained hitherto.

A further feature of the present invention consists in the production of the dyestuff of the following formula

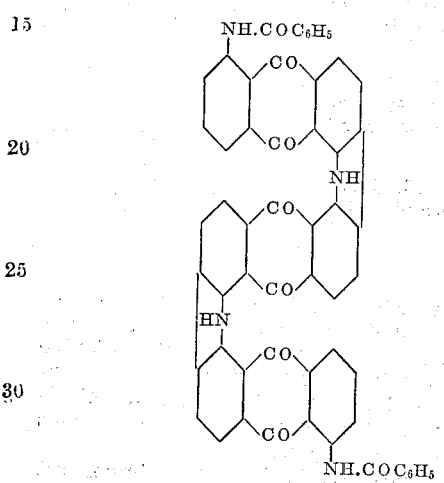

which dyestuff dyes cotton in very fast orange shades.

The following examples illustrate the invention without, however, restricting it thereto, the parts being by weight:

*Example 1*

A current of sulfur dioxide is passed into 30 parts of a powdered mixture consisting of sublimed aluminium chloride and dry sodium chloride (proportion 6:1), until a thinly liquid melt is formed whereby selfwarming occurs. 7.5 parts of a condensation product from 1 mol of 1.5-diaminoanthraquinone with 2 mols of 1-benzoylamino-4-chloroanthraquinone are gradually added. With stirring and further passing of sulfur dioxide into the reaction vessel the temperature is increased within one hour to 90°. At this temperature the condensation is finished in a short time. The melt is poured into 500 parts of ice-water, 130 parts of concentrated sodium lye and about 24 parts of sodium hypochlorite solution are added and the whole boiled up.

The dyestuff separates in dark brown flakes. A purification may be accomplished either by treating the alkaline suspension at 70° with hypochlorite solution or by filtering the suspension while applying suction, washing the filtration-residue, suspending it in diluted sulfuric acid and oxidizing at 90° C. by adding small portions of bichromate. In a nearly theoretical yield a very clear and fast red-brown vat dyestuff is obtained. By a treatment with boiling quinoline little needles are obtained which dissolve in sulfuric acid to form a purple-colored solution and yield on diluting with water clear red-brown flakes.

A modification of the process described consists in first forming the molecule compound by stirring in a closed vessel aluminium chloride, sodium chloride and liquid sulfur-dioxide, and then carrying out the melt described above.

*Example 2*

40 parts of aluminium chloride are treated while stirring with gaseous or liquid sulfur dioxide, until a thin melt which can easily be stirred is formed. At 70° 10 parts of the same anthrimide as in Example 1 are added in portions and the temperature is increased to 120° whereupon the melt becomes somewhat thicker. The reaction is finished in a short time. The melt is poured into 500 parts of ice-water having an addition of some sodium nitrite. The solution is boiled up and is strongly acidified during boiling with hydrochloric acid and the dyestuff separated in the usual manner. A bluish grey compound is obtained in which aluminium is still detected. When boiled up with diluted sodium lye it is decomposed and (if necessary by an after-treatment with hypochlorite solution) the same clear red-brown vat dyestuff is obtained as in Example 1 in the same excellent yield.

*Example 3*

To 30 parts of aluminium chloride are added very gradually 15 parts of solid dry sodium bisulfite. The mixture gradually liquefies with warming and care is taken that the temperature does not exceed 50°. 5 parts of the same starting material as in Examples 1 and 2 are added in portions. The temperature gradually increases to 90°. Working up, yield and quality of the reaction product correspond to Examples 1 and 2.

*Example 4*

Into a mixture of 30 parts of aluminium chloride and 5 parts of potassium chloride is passed sulfur dioxide, until the mass has become liquid with selfwarming. At 50° 7 parts of a condensation product from 1 mol of 1.4-dibromobenzene and 2 mols of 1-benzoylamino-5-amino-anthraquinone are added. The temperature is increased to 90°-95° and maintained for a short time. Working up corresponds to that of the foregoing examples. The vat dyestuff obtained is a fast orange. When for the condensation the reaction product from 1 mol of 1.4-dibromobenzene with 2 mols of 1-benzoylamino-4-amino-anthraquinone is chosen a currant-brown is obtained.

*Example 5*

To the mixture of 30 parts of aluminium chloride and 5 parts of sodium chloride which has been liquefied by means of sulfur dioxide are added 5 parts of a compound of the following constitution

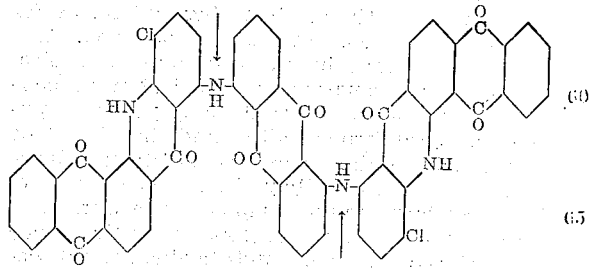

The temperature is gradually increased within about 2 hours to 90° and the melt is worked up as described in the foregoing examples. A brown dyestuff is obtained which dyes cotton from a carmoisin-red vat strong, brown, very fast shades. Carbazolation probably has been effected at the places marked with arrows.

Example 6

A current of sulfur dioxide is passed with stirring over a powdered mixture consisting of 20 parts of aluminium chloride, 2 parts of sodium chloride, 2 parts of potassium chloride and 5 parts of 4-benzoylamino-1.1'-dianthrimide, air moisture being excluded. When the mixture has become pasty with self-warming it is stirred still several hours at 80–90°, sulfur dioxide being slowly passed over, until a test portion poured into excess diluted sodium lye and heated with alkaline sodium hypochlorite solution yields a brown separation which dissolves in concentrated sulfuric acid with purple-red color. When cool the melt may be worked up in the same manner as the test portion.

Example 7

Sulfur dioxide is passed over an intimate mixture consisting of 32 parts of aluminium chloride and 5 parts of sodium chloride while stirring. When the melt has become liquid 8 parts of 5.5'-dibenzamido-1.1'-dianthrimide are added and stirring is still continued for 2–3 hours at 75–80°, sulfur dioxide being slowly passed over. Working up may be performed as described in Example 6 and the carbazole obtained may be revatted for purification from an alkaline hydrosulfite solution. From its deep blue solution in concentrated sulfuric acid an orange precipitate is obtained on diluting with water.

When the condensation product from 1 mol of 5-amino-1.9-anthrapyrimidine and 1 mol of 1-benzoylamino-5-chloroanthraquinone is subjected to the same treatment a dyestuff with similar properties is obtained.

Example 8

25 parts of aluminium chloride and 5 parts of sodium chloride are treated with liquid or gaseous sulfur dioxide, until a liquid melt is formed. To the melt are added at 70° 6 parts of 4-benzoyl-amino - 6' - chloro - 1.1' - dianthraquinonylamine. Then the temperature is gradually increased to 90° and the reaction mixture maintained at this temperature for 2 hours while stirring. By pouring into ice-water the melt is decomposed. Sodium lye is added until a strong alkaline reaction is reached. At 70° small portions of sodium hypochlorite solution are added, until it is no longer used up. The dyestuff is separated in the usual manner. It is similar in its properties to the product of Example 6. Cotton is dyed from the vat fast brown shades.

Example 9

To the melt prepared from 25 parts of aluminium chloride, 5 parts of sodium chloride and sulfur dioxide are added at room temperature with stirring 5 parts of a product obtained by condensation of 1 mol of Bz-1.6-dibromobenzanthrone with 2 mols of 1-benzoylamino-5-aminoanthraquinone. The temperature is gradually increased to 80° and maintained for 1–2 hours. By working up with alkali lye and hypochlorite a dyestuff is obtained which from a red-brown hydrosulfite vat yields yellowish brown shades.

Example 10

A brown dyestuff is obtained from the condensation product of symmetrical tribromobenzene with 3 mols of 1-amino-5-benzoylamino-anthraquinone in the same manner as described in Example 9.

Example 11

To a melt obtainable according to Example 8 from 25 parts of aluminium chloride, 5 parts of sodium chloride and sulfur dioxide are added at 60° with stirring 5 parts of a condensation product from 1 mol of dibromodibenz-pyrenequinone (according to German Patent 561,441, Example 6) with 2 mols of 1-amino-5-benzoylamino-anthraquinone. The temperature is increased to 85–90° and maintained for 2 hours. The melt is poured into ice-water and boiled up with an addition of a small portion of sodium nitrite and subsequently made strongly alkaline by addition of sodium lye. Precipitate is filtered with suction and washed. It is suspended with water, the suspension is acidified with sulfuric acid and stirred at 85–90° with addition of small portions of bichromate, until a lasting excess of bichromate is indicated by potassium-iodide-starch paper. The dyestuff is filtered with suction and rinsed. It represents a brown paste which can be easily vatted with reddish-violet color. From this vat very fast reddish-brown dyes are obtained.

A bluish-currant is obtained when the condensation product from 1 mol of dibromodibenz-pyrenequinone with 2 mols of 1-amino-4-benzoyl-amino-anthraquinone is treated at 110° in a corresponding manner.

Example 12

60 parts of a mixture consisting of aluminium chloride and sodium chloride (proportion 5:1) are treated with sulfur dioxide, until a liquid melt has been formed and to the melt are added at 50° 14 parts of the trianthrimide from 1 mol of 1.5-dichloro-anthraquinone and 2 mols of 1-amino-5-benzoylamino-anthraquinone. The temperature is increased to 90–95° with stirring, until the starting material can no longer be detected in the melt. The reaction mixture is decomposed with the aid of ice-water and excess sodium lye, 60 parts of hypochlorite solution are added and the whole boiled up. The suspension thus obtained is filtered with suction, rinsed and suspended with diluted 10% sulfuric acid and at 90° small portions of sodium bichromate are added with stirring, until an excess of sodium bichromate is present. The dyestuff is separated in the usual manner. In dry state it represents a brownish-yellow powder which dissolves in concentrated sulfuric acid with deep blue color. In form of a paste it represents a dough, which can be easily vatted. From a reddish-brown vat strong, very fast, brown-orange dyes are obtained.

By dissolving in concentrated sulfuric acid and gradually diluting with water a brown sulfate is obtained which yields decomposed with water a clear orange dyeing paste.

Example 13

Into 40 parts of a mixture of aluminium chloride and sodium chloride (proportion 5:1) is passed liquid or gaseous sulfur dioxide, a liquid melt being formed with self-warming. To this melt are added at 60° 6 parts of a tetra-anthrimide which is obtained by condensation of 1 mol of 4.4'-dibromo-1.1'-dianthrimide with 2 mols of 1 - amino- 5'-benzoylamino-anthraquinone. The melt is gradually heated with stirring at 85° and maintained for about 2 hours at this temperature, until starting material cannot be further detected. The melt is decomposed with ice-water, made alkaline with excess sodium lye and boiled up a short time with addition of an amount of hypochlorite solution being necessary for the oxidation of the intermediate product. The reaction product is filtered by suction and rinsed neutral. For purification it may be treated in diluted warm sulfuric acid with bichromate. By separation in the usual manner a paste is obtained which from the vat dyes khaki-brown-colored.

Example 14

A mixture consisting of 25 parts of aluminium chloride and 5 parts of sodium chloride is liquefied by means of sulfur dioxide and to the melt are added at about 50° 5 parts of 4-benzolamino-1-(Bz-1-benzanthronyl)-amino-anthraquinone and for 2 hours heated at 80°. By separation in the usual manner a brown paste is obtained which dyes cotton from a red-brown hydrosulfite vat fast, strong, yellowish-brown shades. By using the conversion product from 1 mol of Bz-1.6-dibromobenzanthrone with 2 mols of 1-amino-4-benzoylamino-anthraquinone a red-brown dyestuff is obtained.

Example 15

To 50 parts of the condensing agent obtained from aluminium chloride, sodium chloride and sulfur dioxide are added at about 25° 10 parts of 1-benzoylamino-5-(β-naphthyl)-amino-anthraquinone and allowed to stir at this temperature for about 3 hours. By separation in the usual manner an orange-colored paste is obtained which from a red-brown vat dyes vegetable fibers strong orange shades. Besides carbazolation substitution by a sulfine acid radical has probably resulted. This appears to be the case, because by oxidation, for instance with hydrogen superoxide, a sulfonic acid group is formed. The product thus obtained dyes wool from a diluted sulfuric acid solution fast orange shades. In a corresponding manner 1-benzoylamino-4-(β-naphthyl)-amino-anthraquinone can be converted. The dyestuffs are brown.

Example 16

By mixing 100 parts of sublimed aluminium chloride with 20 parts of dry sodium chloride and treating this mixture long enough with gaseous or liquid sulfur dioxide, a clear liquor is obtained having about the consistency of concentrated sulfuric acid. This liquor is especially suited for the condensation.

To 35 parts of the condensation agent thus obtained are added with stirring 6 parts of the blue product which is obtainable from 1 mol of symmetrical tribromobenzene with 3 mols of 1-benzoylamino-4-amino-anthraquinone. The temperature is increased while continuously stirring to 85-90°, the reaction being finished after about one hour. By stirring into excess diluted sodium lye and treating with some sodium hypochlorite at 60-70° a strong currant-colored product is obtained which from a brown vat dyes vegetable fibers very fast currant shades.

Instead of sodium chloride there can be used other suitable salts, e. g. dry calcium chloride or magnesium chloride.

Example 17

To 100 parts of the condensation agent prepared according to Example 16, paragraph 1, are added in the cool 15 parts of the olive-colored condensation product from 1 mol of 1.5-dichloro-anthraquinone with 2 mols of 4-amino-anthraquinone-3'-chloro-1.2-acridone of the formula

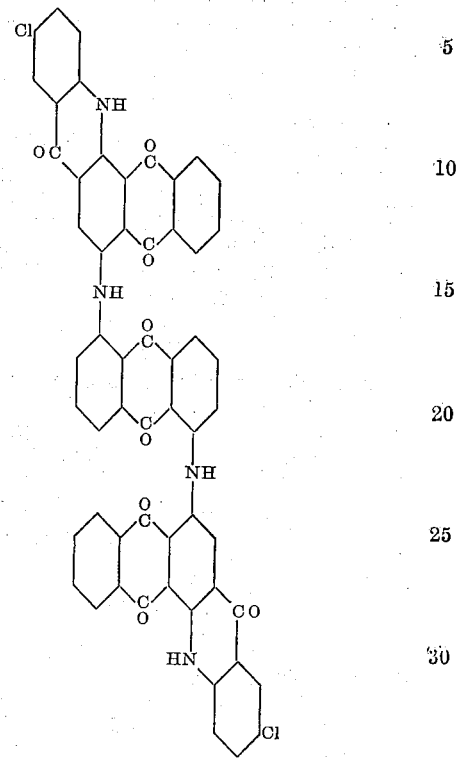

The temperature is increased with stirring to 90° and the reaction mixture worked up in an alkaline medium as usual. The vat dyestuff thus obtained is a fast brownish-currant.

Example 18

The condensation product from 1 mol of 1.4.5.8.-tetraamino-anthraquinone with 4 mols of 1-chloro-5-benzoylamino-anthraquinone when treated with the carbazolating agent a khaki-brown vat dyestuff.

Example 19

A very fast bordo is obtained when 2 parts of 1-benzoylamino-4-(2'.5'-dichlorophenyl)-amino-anthraquinone are stirred for one hour and a half in 20 parts of the new condensing agent at 85°. Working up is as usual.

We claim:

1. The process which comprises reacting aluminium chloride in the presence of a compound selected from the group consisting of sulfur dioxide and alkali bisulfite with secondary aromatic amines wherein at least one of the aromatic radicals is a radical selected from the group consisting of an acylamino anthraquinone radical and an anthraquinone radical having condensed therewith further nuclei and at least one ortho-position with respect to the secondary amino groups is unsubstituted in both of the radicals.

2. The process as claimed in claim 1 wherein the reaction is carried out with addition of a neutral salt.

3. The process as claimed in claim 1 wherein the reaction is carried out with addition of sodium chloride.

4. The dyestuff prepared by reacting aluminium chloride in the presence of a compound selected from the group consisting of sulfur dioxide and alkali bisulfite with 5′.5″-dibenzoylamino-1′.1″-1.5-trianthrimide, dissolving the reaction product in concentrated sulfuric acid, diluting with water, separating the brown sulfate and decomposing it with water, this dyestuff, representing a substantially pure carbazole of the said starting material and being free from any substantial amount of acridines of the said starting material, dyeing cotton in very fast clear orange shades.

FRANZ WIENERS.
WALTER MIEG.